Feb. 25, 1936. M. STUBNITZ 2,031,745
COMBINATION AIR AND SPRING CUSHION SEAT AND THE LIKE
Filed June 13, 1933 2 Sheets-Sheet 2
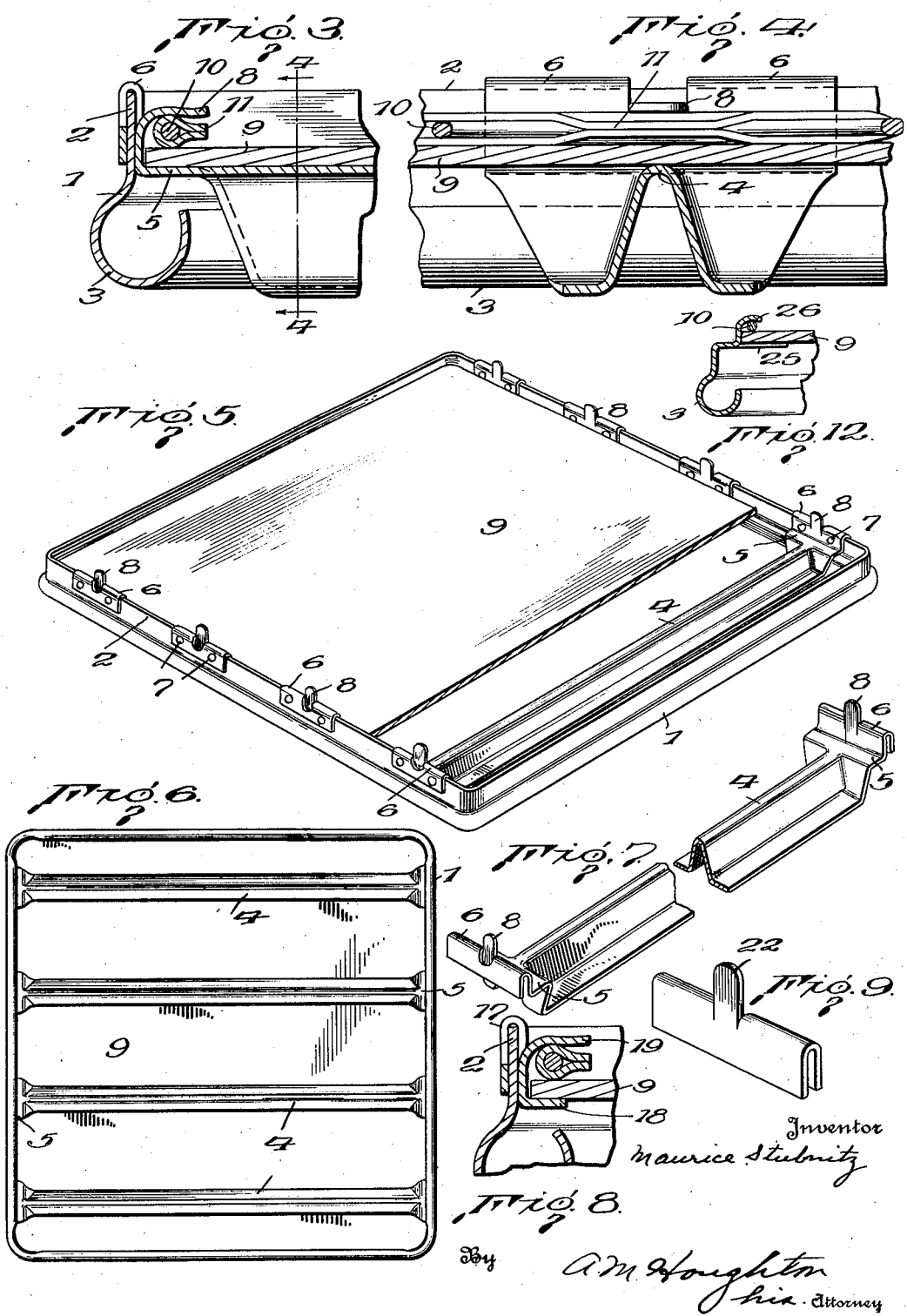

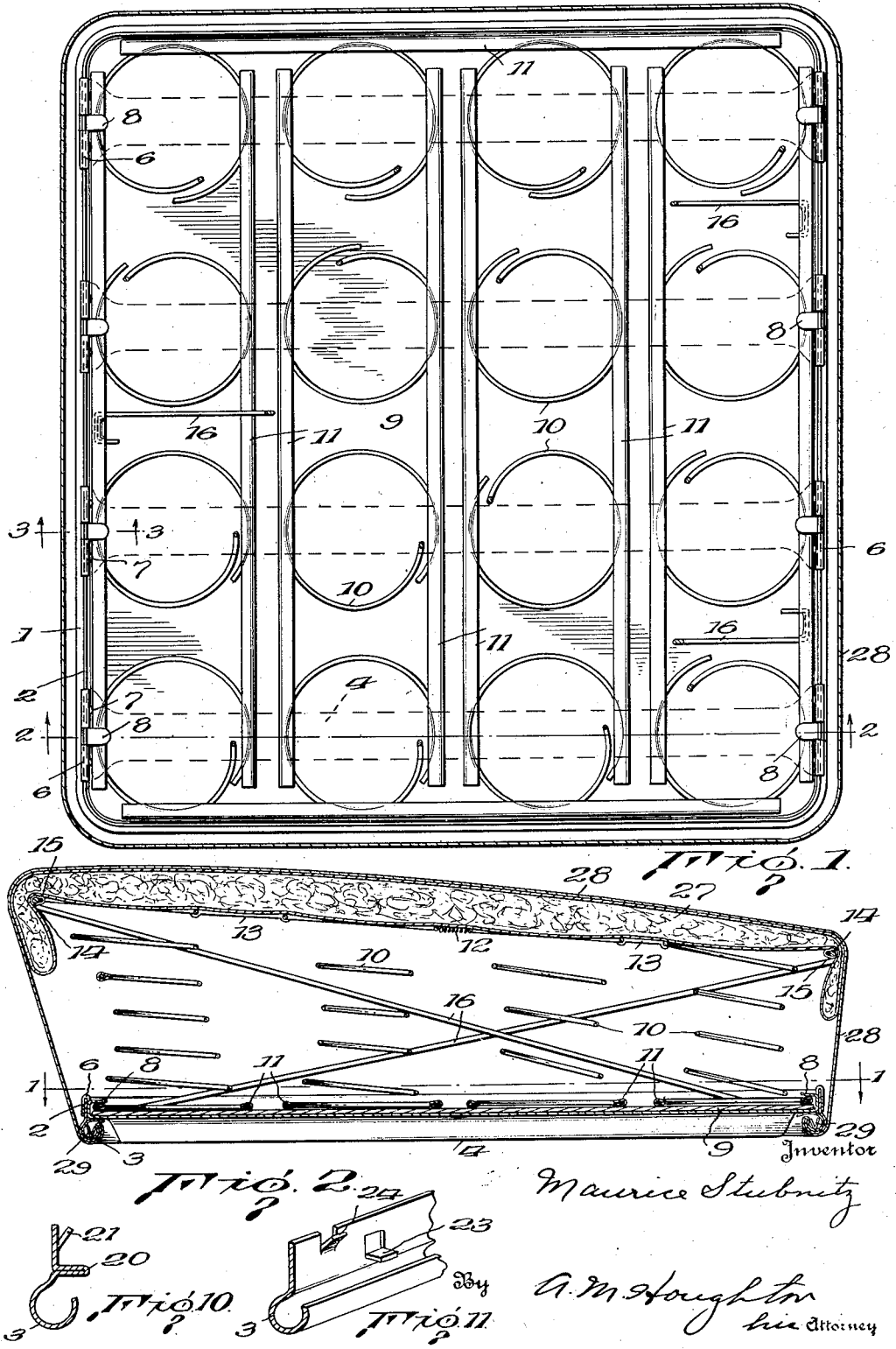

Patented Feb. 25, 1936

2,031,745

UNITED STATES PATENT OFFICE 2,031,745

COMBINATION AIR AND SPRING CUSHION SEAT AND THE LIKE

Maurice Stubnitz, Pittsburgh, Pa., assignor to Fort Pitt Bedding Company, Pittsburgh, Pa., a corporation of Pennsylvania Application June 13, 1933, Serial No. 675,610

9 Claims. (Cl. 155—180)

This invention relates to combination air and spring cushion seats and the like; and it comprises a cushion seat of the above character constructed of preformed units adapted for ready assemblage, such units being a seat bottom plate, a spring assembly and a lower border frame, the lower border frame being provided with means for supporting and clamping the bottom plate and spring assembly; all as more fully hereinafter set forth and as claimed.

Combination air and spring cushion seats are well known in this art, but they are relatively complicated in construction and expensive in manufacture. One reason for this is because of the uniform practice of providing an airtight joint between the bottom plate of the seat and the lower border frame necessitating the provision of a valve or suitable perforations in the bottom or sides of the seat to permit restricted inflow and outflow of air. Thus it is usual to have the seat bottom plate independently joined to the border frame by a more or less complex air proof joint and to have the springs individually secured to the bottom plate or to both the bottom plate and the border frame.

In the present invention the construction and method of assemblage of these seats have been greatly simplified and the cost of manufacture reduced to a minimum. The lower border frame, as a unit, is provided with means for supporting and securing the bottom plate and the springs. This supporting means is in the nature of a shelf on which the bottom plate rests, and the springs which have been previously arranged together as a unit are then placed on the bottom plate. Suitable tongues provided above the bottom plate support are then bent over the lower edges of the spring assembly and bottom plate to clamp the two in position on the frame. The joint so provided is not air proof but permits restricted inflow and outflow of air around the edges of the plate making unnecessary the provision of a separate air valve or perforation for this purpose.

The restricted flow of air serves as a snubber when the seat is in use, and supplements the action of the springs in absorbing road shocks. Thus, springs of less strength than usual may be used and, when used, impart to the cushion characteristic soft and smooth riding qualities, eliminating the tiresome joggle present in ordinary spring cushions. In a specific embodiment of my invention the means for supporting the bottom plate of the seat comprises reinforcing members or cross bars connecting opposite sides of the border frame. The ends of the cross bars are arranged to hook over the sides of the frame and are provided adjacent the frame with struck-out tongues adapted to be bent over the spring assembly and the bottom plate and hold them against the cross bars. When this construction is used the bottom plate may be simply a sheet of cardboard, fiber or the like. My invention in a broader aspect contemplates the use of clips instead of cross bars for supporting the plate or provides for the frame itself supporting the plate. The member supporting the plate is provided with struck-out portions adapted to be bent over the spring assembly or the border frame as above described. When cross bars are not used, a more rigid bottom plate of metal or the like is substituted for the cardboard plate in order to provide sufficient support for the springs.

In the accompanying drawings illustrating several forms of a specific embodiment of my invention:

Fig. 1 is a horizontal section of the seat taken along line 1—1 of Fig. 2 looking in the direction of the arrows and shows the unit construction of the spring assembly;

Fig. 2 is a vertical section taken along line 2—2 of Fig. 1;

Fig. 3 is an enlarged detailed sectional view taken along line 3—3 of Fig. 1 and shows the connection of the cross bar with the border frame and the struck-out tongue on the end of the cross bar engaging the lower edge of the spring assembly to clamp it and the seat bottom against the cross bar;

Fig. 4 is a detailed segmental sectional view taken along line 4—4 of Fig. 3 looking in the direction of the arrows;

Fig. 5 is a perspective view of the bottom of the seat with a portion of the bottom plate broken away exposing a cross bar;

Fig. 6 is a plan view of the underside of the bottom of the seat;

Fig. 7 is a detailed perspective of the cross bar showing the struck-out tongues at its ends;

Fig. 8 is a detailed sectional view of a modified form of the invention in which a clip-like support provided with a punched out tongue is substituted for the cross bars;

Fig. 9 is a view in perspective of another form of clip used to hold the spring assembly to the bottom plate;

Fig. 10 is a segmental detail cross sectional view of a modified form of border frame, reversed upon itself to provide a support for the seat bottom and spring assembly;

Fig. 11 is a perspective detail sectional view of another modified form of border frame wherein the plate support and clamping means are both members struck from the frame; and Fig. 12 is a further modified form of border frame, the top portion of which is bent inwardly to provide a support for the bottom plate.

Referring to the drawings wherein like numerals indicate corresponding parts throughout the several views, the numeral 1 designates the lower border frame of the seat. This border frame is made of stamped or rolled metal and comprises a continuous band provided along its top edge with a vertical inwardly offset extension 2 for reception of the cross bars or seat bottom plate supporting means and provided along its bottom edge with an inwardly and upwardly curved extension defining a recess or pocket 3 for reception of the seat cover. As shown in the drawings the seat bottom supporting means may be positioned intermediate the top and bottom of the upper portion of the frame. The cross bars 4 connecting the sides of the frame are of the inverted V-shaped channel type, flattened at their ends 5 and bent to provide a U-shaped hook 6 adapted to fit over the vertical extension on the border frame. The bars are held in position on the frame by punching, spot welding, riveting or the like, represented generally by the numeral 7. The ends of the cross bars are provided with tongues 8 struck-out from the walls of the hooked ends as shown. Resting on top of the cross bars is a seat bottom plate 9 of cardboard, fiber or the like. This plate entirely closes the bottom of the seat but is slightly smaller in dimensions than the dimensions of the frame to permit restricted inflow and outflow of air around the edges of the plate and between the border frame. A preformed spring assembly unit rests on top of the plate. This assembly fits closely within the frame and comprises a number of coil springs 10 arranged in rows with their bottom end coils clamped to spacing bars 11, running the length of the rows and across the ends. The top end coils of the springs are secured together in the usual manner as by small coil springs 12 and metal links 13 or the like, as shown, and carry an upper border frame 14 of stout wire to which they are secured by metal clamps 15. This spring assembly is suitably reinforced by struts 16 connecting opposite top sides of the assembly with the spacing bars at the bottom. The spring assembly is positioned on the bottom plate within the lower border frame of the seat and held in position together with the bottom plate by the tongues 8 which are simply bent over the adjacent spacing bars of the spring assembly.

In place of a cardboard bottom plate a rigid steel or other plate may be used. In this event the cross bars may be dispensed with and a clamp 17, as shown in Fig. 8, substituted therefor. This clamp is adapted to hook over the side of the border frame and is provided with an inwardly extending horizontal flange 18 for supporting the bottom plate and with tongues 19 struck-out from the walls of the hooked portion for clamping the springs and the bottom plate to the support.

The invention is susceptible of various modifications. For instance, the border frame itself may be constructed with an inwardly extending shoulder 20 as shown in Fig. 10 by doubling the frame back upon itself. In this form a separate clamp is not necessary, the tongues 21 being struck from the frame. If desired, however, a clamp such as shown in Fig. 9 provided with a tongue 22 may be used. In another modification, shown in Fig. 11, both the tongue and the plate supporting means may be struck-out from the frame, the plate support being represented by the numeral 23 and the clamping tongues by the numeral 24. In still another modification the upper portion of the frame may be bent inwardly and horizontally to provide a support 25 for the plate and a tongue 26 struck-out therefrom to clamp the spring and plate to the support.

The assembly of the seat is completed by positioning stuffing material 27 on top of the spring assembly and placing a cover 28 over the stuffing material and down the sides of the seat; the edge of the cover being tucked in pocket 3 on the border frame and held therein by a plurality of spring clips 29. These spring clips are V-shaped in cross section and are normally of greater width than the width of the pocket. When in position on top of the cover in the pocket they are compressed and their edges firmly press the cover against the walls of the pocket to hold the cover on the frame.

By constructing the seat as described above it may be assembled quickly without the use of special or cumbersome tools. The bottom plate and spring assembly are simply placed on the support on the frame and the tongues bent over their edges. The stuffing material is then placed over the springs and the cover over the stuffing material. The cover is drawn tight down the sides of the seat and tucked into the pocket and spring clips inserted in the pocket on top of the cover to hold it securely in place. The top edge of the border frame as shown is offset inwardly to prevent wear of the cover due to rubbing against it.

The combined air and spring cushion seat above described is simple and inexpensive in manufacture and strong annd durable in use. The different units which go to make up the complete seat are arranged for quick and easy assemblage without the use of special tools. By providing a loose fitting bottom plate the use of a separate air valve is not necessary and construction of the seat in general greatly simplified. The invention is useful in the construction of the backs of seats as well as in the construction of the seats themselves.

What I claim is:

1. A spring cushion seat and the like comprising a lower border frame, cross bars bridging sides of said frame, a bottom plate resting on said cross bars, a spring assembly resting on said bottom plate, tongues struck out from the ends of said cross bars, said tongues being bent over the lower edges of the spring assembly and bottom plate to clamp the assembly and the plate to the cross bars, stuffing on top of the spring assembly and a cover over the stuffing, and extending down the sides of the seat to the lower border frame and secured thereto.

2. A spring cushion seat and the like comprising a lower border frame provided with a vertical, inwardly offset upper portion and an inwardly and upwardly curved lower portion forming a pocket, cross bars bridging sides of the border frame, the ends of said bars provided with inverted U-shaped end hooks fitting over the vertical offset portions of the frame, a bottom plate resting on said cross bars, a spring assembly on top of the bottom plate, tongues struck out from the walls of the U-shaped hook at the ends of the cross bars, extending over the lower edges of the spring assembly and clamping the assembly and the plate to the cross bars, stuffing on top of the spring assembly, and a cover over said stuffing said cover extending down the sides of the seat and secured in the pocket on the border frame.

3. In a combination air and spring cushion seat and the like, a lower border frame comprising an upper portion and a lower portion, means restricting the inflow and outflow of air to and from the interior of the seat comprising an imperforate bottom plate, means positioned intermediate the top and bottom of said upper portion and projecting inwardly of said border frame adjacent said upper portion to form a shelf, the imperforate bottom plate resting on said shelf for support within the frame, said plate being of slightly less dimensions than the dimensions of the frame to provide a substantially continuous but restricted passageway for air between the edges of the plate and the border frame, a seat cover and a pocket formed by the lower portion of the border frame for securing the cover to the seat.

4. A spring cushion seat and the like comprising a lower border frame, cross bars bridging the sides of said frame, an imperforate plate resting on said cross bars, a spring assembly resting on the bottom plate, and tongues struck out from the ends of said cross bars for clamping the bottom plate and spring assembly in position, said bottom plate being of slightly less dimensions than the dimensions of the border frame to provide a substantially continuous but restricted passageway for air between the edges of the plate and the border frame.

5. A spring cushion seat and the like comprising a lower border frame, cross bars bridging sides of said frame, a bottom plate resting on said cross bars, a spring assembly positioned within the confines of said border frame, tongues struck out from the ends of said cross bars, said tongues being bent over the lower edges of the bottom plate to clamp the plate to the cross bars, stuffing on top of the spring assembly and a seat cover over the stuffing, said cover extending down the sides of the seat and secured to the lower border frame.

6. In a cushion seat and the like, an imperforate seat bottom plate, a spring assembly, a seat cover and a lower border frame, said frame comprising an upper portion and a lower portion, a member positioned intermediate the top and bottom of said upper portion and projecting inwardly adjacent said upper portion to form a shelf, the seat bottom plate and spring assembly resting on said shelf for support within the border frame, a second member projecting inwardly adjacent said upper portion and above said first mentioned inwardly projecting member for clamping the spring assembly and seat bottom plate to said first mentioned member, the lower portion of the border frame being curved inwardly and upwardly to form a pocket for reception of the extremities of the seat cover to clamp the cover on the seat, the seat bottom plate being of slightly less dimensions than the dimensions of the lower border frame to provide a substantially continuous but restricted passageway for air between the edges of the plate and the border frame.

7. A cushion seat and the like comprising a lower border frame, cross bars bridging opposite sides of said frame, a relatively thin, flexible imperforate seat bottom plate resting on top of said cross bars and fitting closely within the confines of the border frame, coil springs mounted on top of said bottom plate and arranged directly over the cross bars so that pressure exerted on the springs is absorbed substantially entirely by the cross bars and whereby the seat bottom plate is substantially free from supporting the weight applied to the cushion seat and a cover over said springs and secured to the border frame.

8. A cushion seat and the like comprising a lower border frame, cross bars bridging opposite sides of said frame, a substantially imperforate seat bottom plate carried by said cross bars, said plate fitting closely within the confines of said border frame and arranged to restrict the inflow and outflow of air to and from the interior of the seat, a spring assembly positioned within the limits of said border frame and arranged over the cross bars so that pressure exerted on the springs is absorbed substantially entirely by the cross bars and the seat bottom plate is substantially relieved from supporting the weight applied to the cushion seat, and a cover over said springs and secured to the border frame.

9. A cushion seat and the like comprising a lower border frame, cross bars bridging opposite sides of said frame, a spring assembly positioned within said border frame, said assembly being arranged with respect to the cross bars so that pressure exerted on the assembly is adsorbed substantially entirely by the cross bars, a substantially imperforate seat bottom plate, means for holding the spring assembly to the border frame and securing the said plate thereto, said plate fitting closely within the confines of the border frame for restricting inflow and outflow of air to and from the interior of the seat, said bottom plate being substantially relieved from supporting the weight applied to the cushion seat, stuffing on top of said spring assembly and a cover over said stuffing and secured to the lower border frame.

MAURICE STUBNITZ.